United States Patent
Chen (10) Patent No.: US 8,941,593 B2
(45) Date of Patent: Jan. 27, 2015

(54) POINTER CONTROL METHOD AND DEVICE

(71) Applicant: Wistron Corporation, New Taipei (TW)

(72) Inventor: Hou-Cheng Chen, New Taipei (TW)

(73) Assignee: Wistron Corporation, New Taipei (TW)

( * ) Notice: Subject to any disclaimer, the term of this patent is extended or adjusted under 35 U.S.C. 154(b) by 248 days.

(21) Appl. No.: 13/741,037

(22) Filed: Jan. 14, 2013

(65) Prior Publication Data
US 2014/0078064 A1 Mar. 20, 2014

(30) Foreign Application Priority Data
Sep. 19, 2012 (CN) .......................... 2012 1 0350401

(51) Int. Cl.
G06F 3/02 (2006.01)
G06F 3/023 (2006.01)
G06F 3/0489 (2013.01)

(52) U.S. Cl.
CPC ............ *G06F 3/023* (2013.01); *G06F 3/04892* (2013.01)
USPC .............. 345/168; 345/157; 345/160; 341/22

(58) Field of Classification Search
USPC ......... 345/157, 159, 160, 163, 168, 173, 174; 341/22; 715/773
See application file for complete search history.

(56) References Cited

U.S. PATENT DOCUMENTS

| 5,041,819 A * | 8/1991 | Takeda .......................... 345/160 |
| 7,193,613 B2 * | 3/2007 | Jam ................................ 345/168 |
| 2008/0055242 A1 * | 3/2008 | Hwang ......................... 345/157 |
| 2012/0075187 A1 | 3/2012 | Lee |

FOREIGN PATENT DOCUMENTS

TW 201214204 A 4/2012

OTHER PUBLICATIONS

Taiwan Patent Office, Office Action, Patent Application No. TW101135936, Oct. 17, 2014, Taiwan.

* cited by examiner

*Primary Examiner* — Koosha Sharifi-Tafreshi
(74) *Attorney, Agent, or Firm* — Rabin & Berdo, P.C.

(57) ABSTRACT

A pointer control method and device applicable to a computer system with a keyboard are provided. The keyboard includes control keys and non-control keys arranged in a matrix and each has an X coordinate and a Y coordinates. In the method, after a first key event that more than two non-control keys are pressed simultaneously is detected, a first coordinate is calculated, in which the first coordinate includes an average value of X coordinates and an average value of Y coordinates. A second key event that one non-control key is pressed is then detected, and a second coordinate is calculated, in which the second coordinate includes an X coordinate and a Y coordinate. Finally, a vector defined by the first and second coordinate is calculated, and a moving direction and a moving speed of the pointer are controlled according to the vector.

20 Claims, 8 Drawing Sheets

POINTER CONTROL METHOD AND DEVICE

CROSS-REFERENCES TO RELATED APPLICATIONS

This non-provisional application claims priority under 35 U.S.C. §119(a) on Patent Application No. 201210350401.0 filed in China, P.R.C. on 2012/09/19, the entire contents of which are hereby incorporated by reference.

BACKGROUND

1. Technical Field

The present disclosure relates to a pointer control method and a pointer control device, and in particular, to a pointer control method and a pointer control device applicable to a computer system with a keyboard.

2. Related Art

Input devices of a conventional computer system include a keyboard, a mouse, a trackball, a joystick or a touchpad, and the combination of a keyboard and a mouse or the combination of a keyboard and a touchpad is most popular among users.

When input is implemented through the combination of a keyboard and a mouse or the combination of a keyboard and a touchpad, a consumer must place fingers on the keyboard for typing, and must place one hand on the mouse or touchpad for moving the pointer, resulting in discontinuous operations of typing and moving the pointer.

When input is implemented through full touch operations, typing speed is limited by design of input software and the processing speed of hardware, and the uncomfortable typing experience is adverse to large amounts of typing over a long time. Some suppliers provide external keyboards for specific products, so consumers can use the external keyboards for large amounts of typing over a long time. However, if a user wants to move a cursor during typing, the user must still remove their fingers from the keyboard, resulting in discontinuous operations of typing, and moving the pointer.

Therefore, the operations of typing and moving the pointer are discontinuous on the conventional computer system.

SUMMARY

Accordingly, the present disclosure provides a pointer control method applicable to a computer system. The computer system has a keyboard that includes a plurality of control keys and a plurality of non-control keys, in which the non-control keys are arranged in a matrix and each has an X coordinate and a Y coordinate individually. The pointer control method includes: detecting a first key event, in which the first key event refers to that more than two non-control keys are pressed simultaneously; calculating a first coordinate, in which an X coordinate of the first coordinate is an average value of X coordinates of the non-control keys pressed in the first key event, and a Y coordinate of the first coordinate is an average value of Y coordinates of the non-control keys pressed in the first key event; detecting a second key event, in which the second key event occurs after the first key event, and the second key event refers to that one non-control key is pressed; calculating a second coordinate, in which an X coordinate of the second coordinate is an X coordinate of the non-control key pressed in the second key event, and a Y coordinate of the second coordinate is a Y coordinate of the non-control key pressed in the second key event; calculating a vector defined by the first coordinate and the second coordinate; and controlling movement of the pointer according to the vector.

Through this method, a consumer may use the keyboard to control the movement of the pointer. Therefore, the consumer does not remove their fingers from the keyboard for either typing or controlling movement of the pointer.

The present disclosure also provides another pointer control method applicable to a computer system. The computer system has a keyboard that includes a plurality of control keys and a plurality of non-control keys, in which the non-control keys are arranged in a matrix and each has an X coordinate and a Y coordinate individually. The pointer control method includes: detecting a first key event, in which the first key event refers to that more than two non-control keys are pressed simultaneously; calculating a first coordinate, in which an X coordinate of the first coordinate is an average value of X coordinates of the non-control keys pressed in the first key event, and a Y coordinate of the first coordinate is an average value of Y coordinates of the non-control keys pressed in the first key event; detecting a second key event, in which the second key event occurs after the first key event, and the second key event refers to that more than two non-control keys are pressed simultaneously; calculating a second coordinate, in which an X coordinate of the second coordinate is an average value of X coordinates of the non-control keys pressed in the second key event, and a Y coordinate of the second coordinate is an average value of Y coordinates of the non-control keys pressed in the second key event; calculating a vector defined by the first coordinate and the second coordinate; and controlling movement of the pointer according to the vector.

The present disclosure also provides a pointer control device applicable to a computer system, including a keyboard, a detection module, a calculation module and a control module. The keyboard is electrically connected to the computer system and includes a plurality of control keys and a plurality of non-control keys, in which the non-control keys are arranged in a matrix and each has an X coordinate and a Y coordinate individually. The detection module is used to detect a first key event and a second key event in sequence. The first key event refers to that more than two non-control keys are pressed simultaneously, and the second key event refers to that one non-control key is pressed. The calculation module is used to calculate a first coordinate, a second coordinate and a vector defined by the first coordinate and the second coordinate. An X coordinate of the first coordinate is an average value of X coordinates of the non-control keys pressed in the first key event, and a Y coordinate of the first coordinate is an average value of Y coordinates of the non-control keys pressed in the first key event. An X coordinate of the second coordinate is an X coordinate of the non-control key pressed in the second key event, and a Y coordinate of the second coordinate is a Y coordinate of the non-control key pressed in the second key event. The control module is used to control movement of the pointer according to the vector.

The present disclosure also provides another pointer control device applicable to a computer system, including a keyboard, a detection module, a calculation module and a control module. The keyboard is electrically connected to the computer system and includes a plurality of control keys and a plurality of non-control keys, in which the non-control keys are arranged in a matrix and each has an X coordinate and a Y coordinate individually. The detection module is used to detect a first key event and a second key event in sequence, in which both the first key event and the second key event refer to that more than two non-control keys are pressed simultaneously. The calculation module is used to calculate a first coordinate, a second coordinate and a vector defined by the first coordinate and the second coordinate. An X coordinate of the first coordinate is an average value of X coordinates of the non-control keys pressed in the first key event, and a Y coordinate of the first coordinate is an average value of Y coordinates of the non-control keys pressed in the first key event. An X coordinate of the second coordinate is an average value of X coordinates of the non-control keys pressed in the second key event, and a Y coordinate of the second coordinate is an average value of Y coordinates of the non-control keys pressed in the second key event. The control module is used to control movement of the pointer according to the vector.

The pointer control methods and devices of the present disclosure enable a consumer to control the movement of the pointer through the keyboard.

BRIEF DESCRIPTION OF THE DRAWINGS

The disclosure will become more fully understood from the detailed description given herein below for illustration only, and thus not limitative of the present invention, wherein.

DETAILED DESCRIPTION

Figure 1:
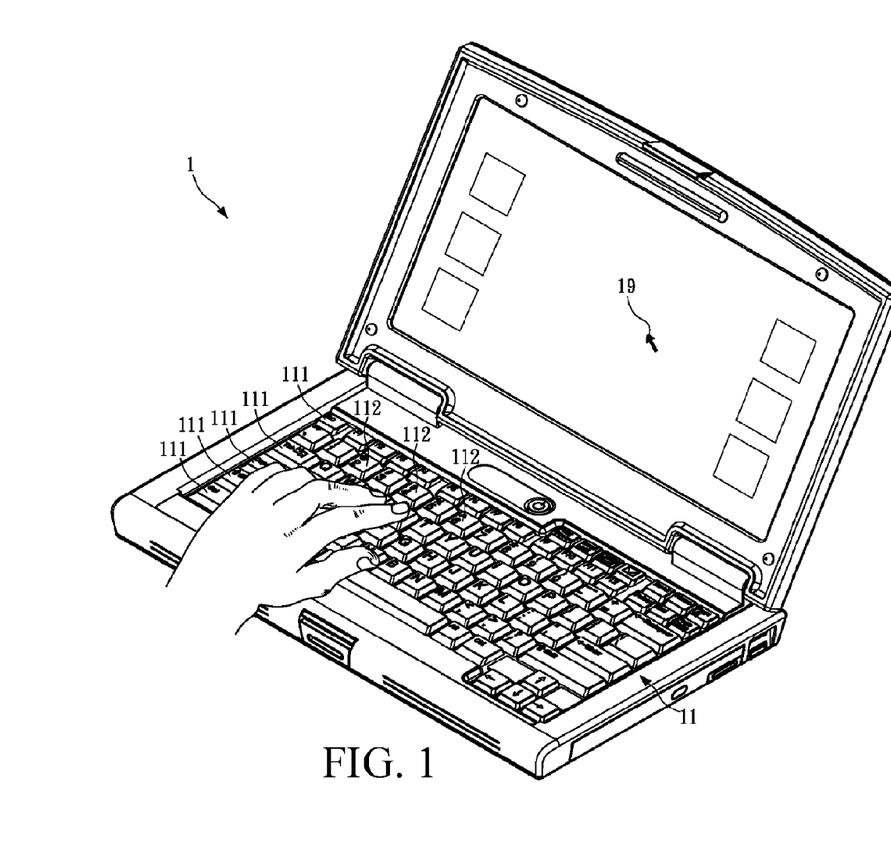
FIG. 1 is a schematic view of a computer system of the present invention.

Please refer to FIG. 1, FIG. 1 is a schematic view of a computer system according to the present disclosure. A computer system 1 is disclosed. The computer system 1 has a keyboard 11 that includes a plurality of control keys 111 and a plurality of non-control keys 112. The control keys 111 refer to keys with special control functions but without a character input function, for example, "Esc", "Tab", "Shift", "Ctrl", "Alt", and so on. The non-control keys 112 refer to keys with a character input function but without a special function, for example, number keys 1 to 9, and letter keys A to Z. The non-control keys 112 are arranged in a matrix and each has an X coordinate and a Y coordinate individually. Further Please refer to FIG. 2 and FIG. 3, respectively a first schematic view and a second schematic view of a first embodiment of the present disclosure. The first embodiment discloses a pointer control method applicable to a computer system 1, and the embodiment includes the following steps.

In Step S01, a first key event is detected.

Figure 2:
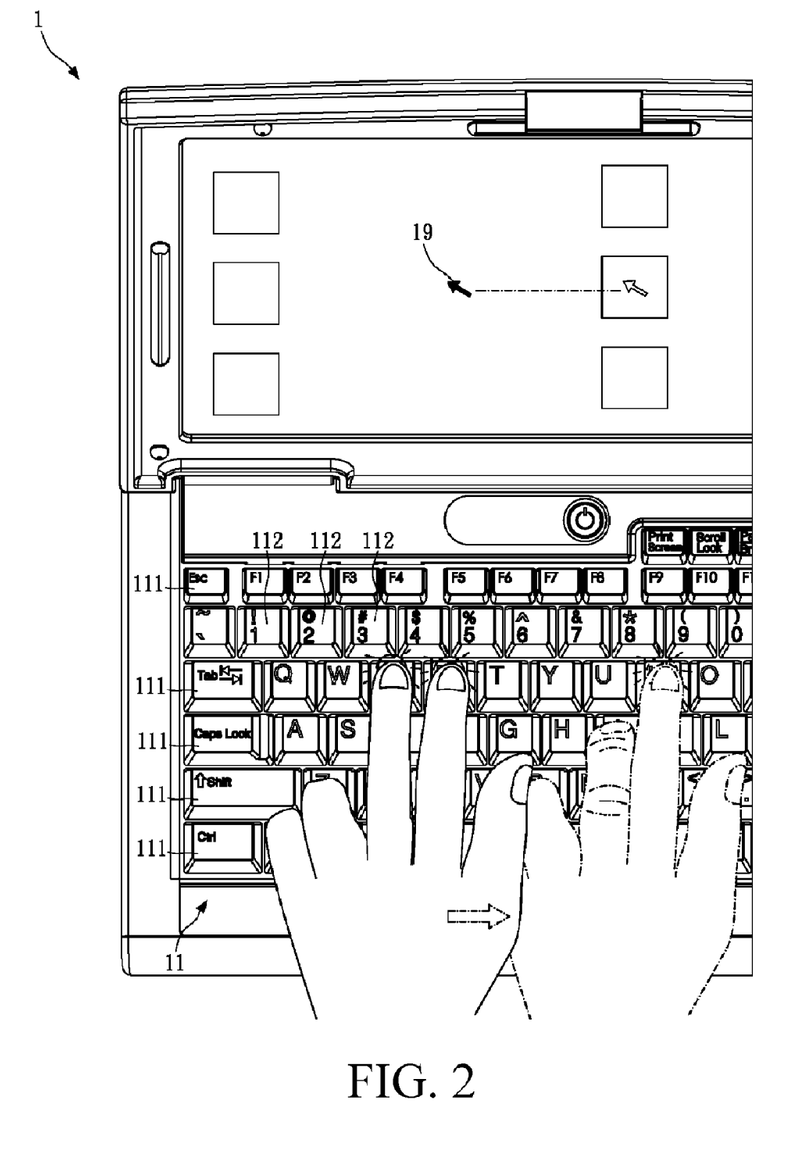
FIG. 2 is a first schematic view of a first embodiment of the present invention.

The first key event of this step refers to that more than two non-control keys are pressed simultaneously. As shown in FIG. 2, two non-control keys (key E and key R), being pressed simultaneously is used as an example.

In Step S02, a first coordinate is calculated.

An X coordinate of the first coordinate is an average value of X coordinates of the non-control keys pressed in the first key event, and a Y coordinate of the first coordinate is an average value of Y coordinates of the non-control keys pressed in the first key event. It is assumed that a coordinate corresponding to the key E is (3, 3), and a coordinate corresponding to the key R is (4, 3). Then, the first coordinate is (3.5, 3).

In Step S03, a second key event is detected.

The second key event occurs after the first key event. The second key event in this embodiment refers to that one non-control key is pressed, for example, as shown in FIG. 2, key I is pressed.

In Step S04, a second coordinate is calculated.

An X coordinate of the second coordinate is an X coordinate of the non-control key pressed in the second key event, and a Y coordinate of the second coordinate is a Y coordinate of the non-control key pressed in the second key event. It is assumed that a coordinate corresponding to the key I is (8, 3). Then, the second coordinate is (8, 3).

In Step S05, a vector is calculated.

In this step, a vector defined by the first coordinate and the second coordinate is calculated. The vector calculated in this embodiment is (4.5, 0), the value thereof is 4.5, and the direction thereof is towards the positive X axis.

In Step S06, movement of the pointer is controlled according to the vector.

The computer system controls the movement of the pointer 19 according to the vector calculated in Step S05, that is, controls the pointer 19 to move towards the positive X axis direction. A moving speed of the pointer 19 may be defined as a moving speed when the vector value is 4.5, which is not specifically limited herein.

Through the foregoing method, a consumer may use the keyboard to control the movement of the pointer. Therefore, the consumer does not remove their fingers from the keyboard for either typing or controlling movement of the pointer, solving the problem of discontinuous operations of typing and moving the pointer in the conventional computer system.

In another implementation aspect, when the vector calculated in Step S05 is not a zero vector, the computer system 1 controls the pointer 19 to move continuously along the direction of the vector. When the vector calculated in step S05 is a zero vector, the computer system 1 controls the pointer to remain static.

In another implementation aspect, the second key event and the first key event occur at an interval of a first time. In Step S06, the moving speed of the pointer is controlled according to a ratio of the value of the vector to the first time. That is, under the circumstance that the value of the vector remains unchanged, if the time interval between the second key event and the first key event is smaller, the moving speed of the pointer 19 is greater. A specific operation is similar to a finger sliding among the non-control keys 112 on the keyboard 11. When the finger slides faster, the moving speed of the pointer is greater. Once the movement is started, the pointer 19 moves continuously and does not stop until a zero vector is input (for example, more than two non-control keys 112 are pressed continuously, which is equivalent to that the first coordinate and the second coordinate are on the same point).

In another implementation aspect, when the pointer is in a static state, a third key event is detected to define so called left mouse button signal and right mouse button signal. The third key event refers to the fact that more than two non-control keys 112 are pressed simultaneously and released, and during the pressing and releasing process, no other non-control keys 112 are pressed. When the pressed non-control keys 112 are adjacent to each other, a left mouse button signal is output.

When the pressed non-control keys 112 are not adjacent to each other, a right mouse button signal is output. It can also be defined that when the pressed non-control keys 112 are adjacent to each other, a right mouse button signal is output, and when the pressed non-control keys 112 are not adjacent to each other, a left mouse button signal is output.

In addition to defining the left mouse button signal and the right mouse button signal according to whether the non-control keys 112 pressed in the third key event are adjacent to each other, in another implementation aspect, the non-control keys 112 are classified into a first non-control key group and a second non-control key group, and a left mouse button signal or a right mouse button signal is output according to whether the non-control keys 112 pressed in the third key event belong to the first non-control key group or the second non-control key group. For example, keys on the left half part of the keyboard, namely, the non-control keys 112 left to key T, key G, and key B (including the key T, key G, and key B), may be defined as the first non-control key group; keys on the right half part of the keyboard, namely, the non-control keys 112 right to key Y, key H, and key N (including the key Y, key H, and key N), may be defined as the second non-control key group. In this manner, when the non-control keys 112 pressed in the third key event belong to the first non-control key group, a left mouse button signal is output; when the non-control keys 112 pressed in the third key event belong to the second non-control key group, a right mouse button signal is output. The above description is merely an example of a method for defining the first key group and the second key group, and the present disclosure is not limited thereto.

Figure 3:
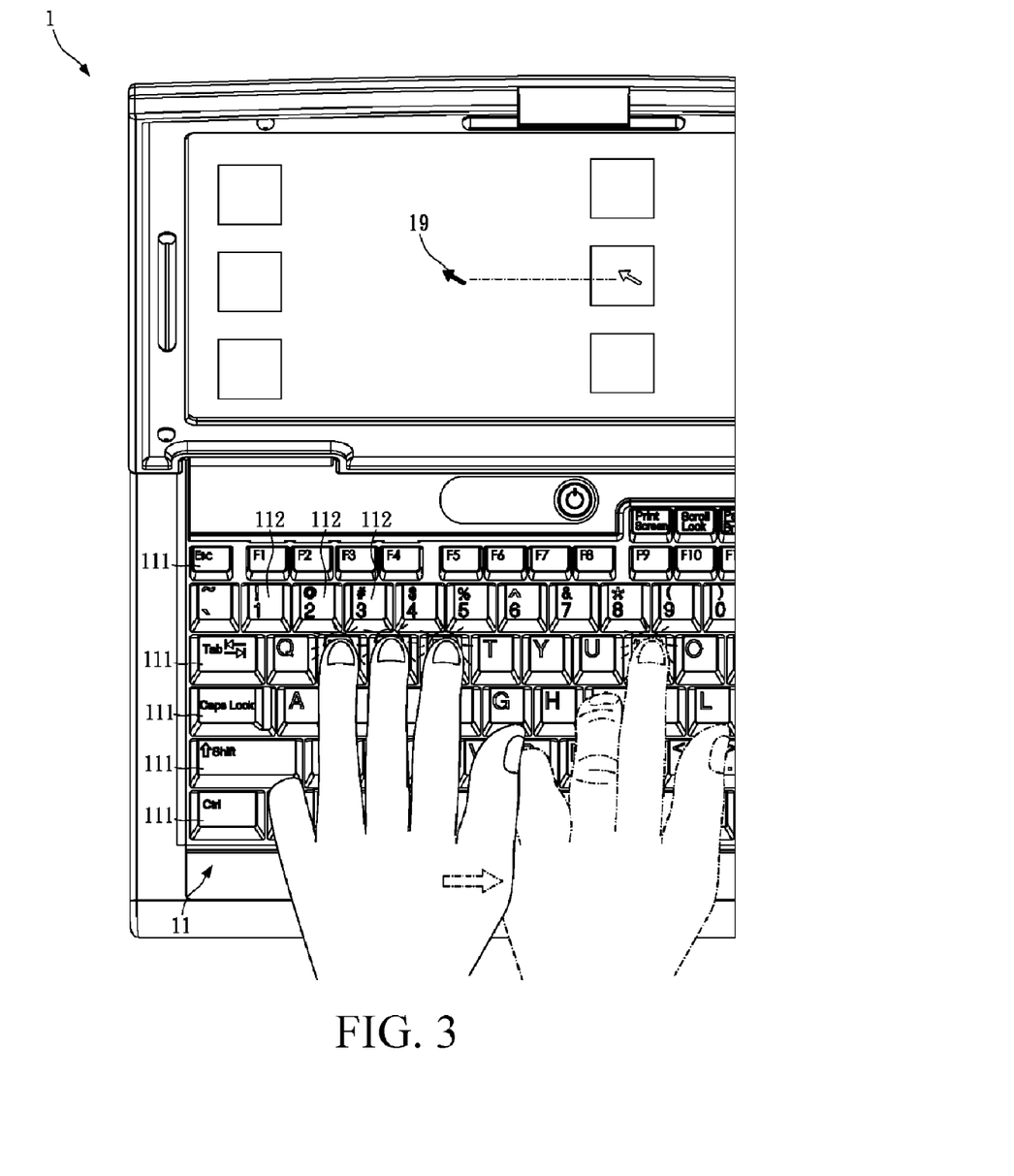
FIG. 3 is a second schematic view of the first embodiment of the present invention.

In another implementation aspect, the first key event in Step S01 may also be that three keys are pressed simultaneously. As shown in FIG. 3, the three keys pressed are key W, key E and key R. It is assumed that coordinates thereof are respectively (2, 3), (3, 3), and (4, 3). Then, the first coordinate calculated in Step S02 is (3, 3). Similarly, four or more keys may be pressed simultaneously. However, it should be noted that, in firmware of the conventional keyboard, simultaneous pressing of multiple non-control keys 112 is regarded as a mis-touch. The problem may be solved if an n-key rollover keyboard is used, but the present disclosure is not limited thereto.

Figure 4:
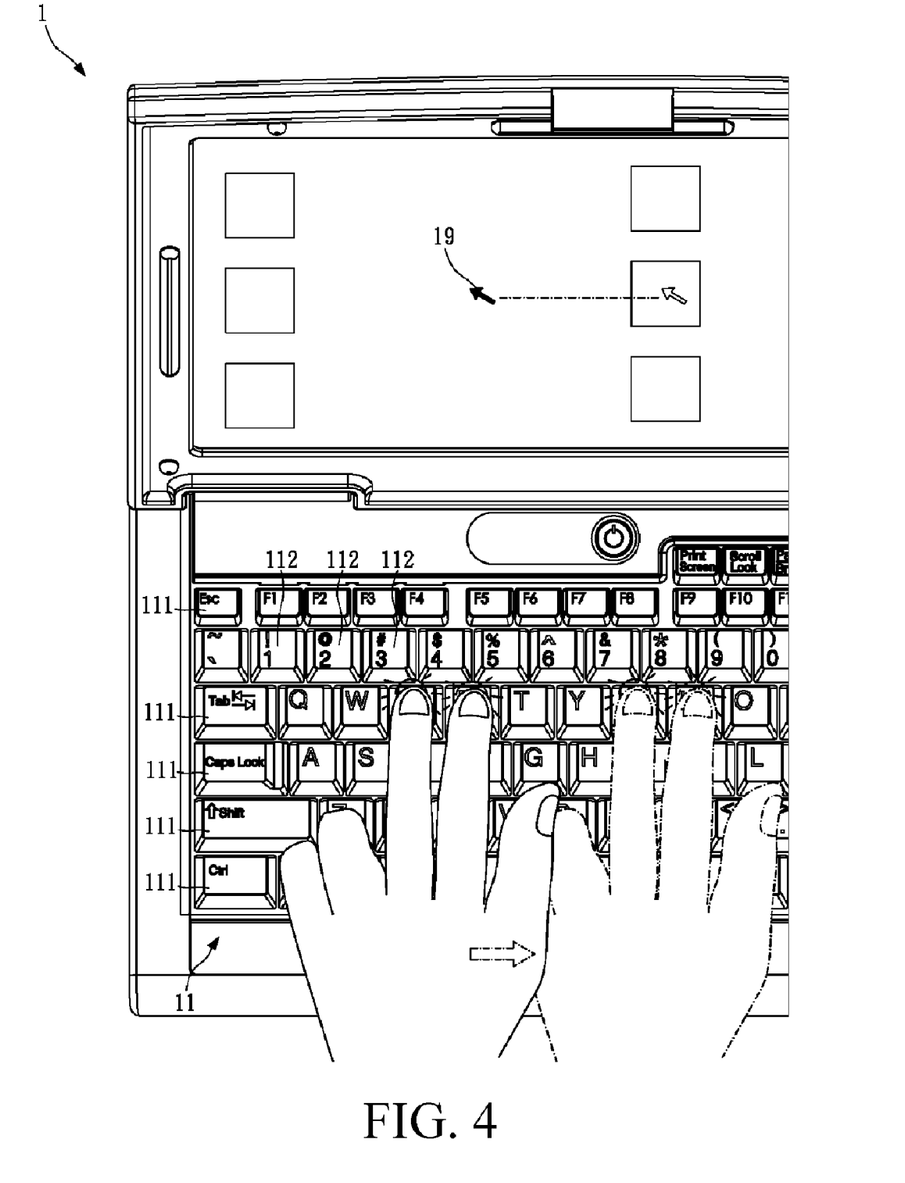
FIG. 4 is a first schematic view of a second embodiment of the present invention.
Figure 5:
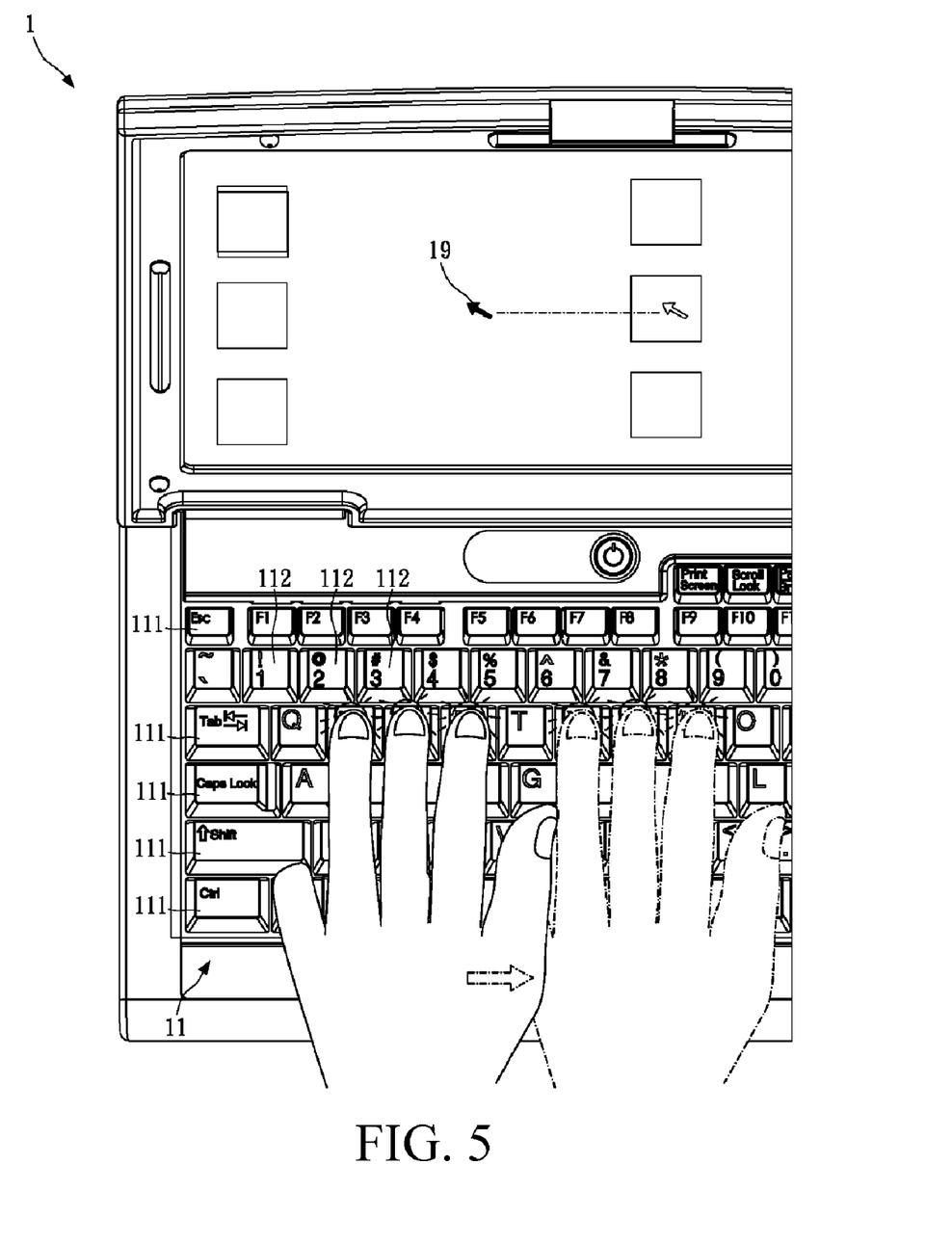
FIG. 5 is a second schematic view of the second embodiment of the present invention.

Please refer to FIG. 4 and FIG. 5, respectively a first schematic view and a second schematic view of a second embodiment of the present disclosure. This embodiment differs from the first embodiment mainly in Step S03 and Step S04, which are described as follows.

In the second embodiment, the second key event refers to that more than two non-control keys 112 are pressed simultaneously. As shown in FIG. 4, two non-control keys, namely, key U and key I, are pressed simultaneously. As shown in FIG. 5, three non-control keys, namely, key Y, key U and key I are pressed simultaneously. That is, in this embodiment, both the first key event and the second key event refer to that more than two non-control keys 112 are pressed, and other steps are generally the same as those in the first embodiment.

Figure 6:
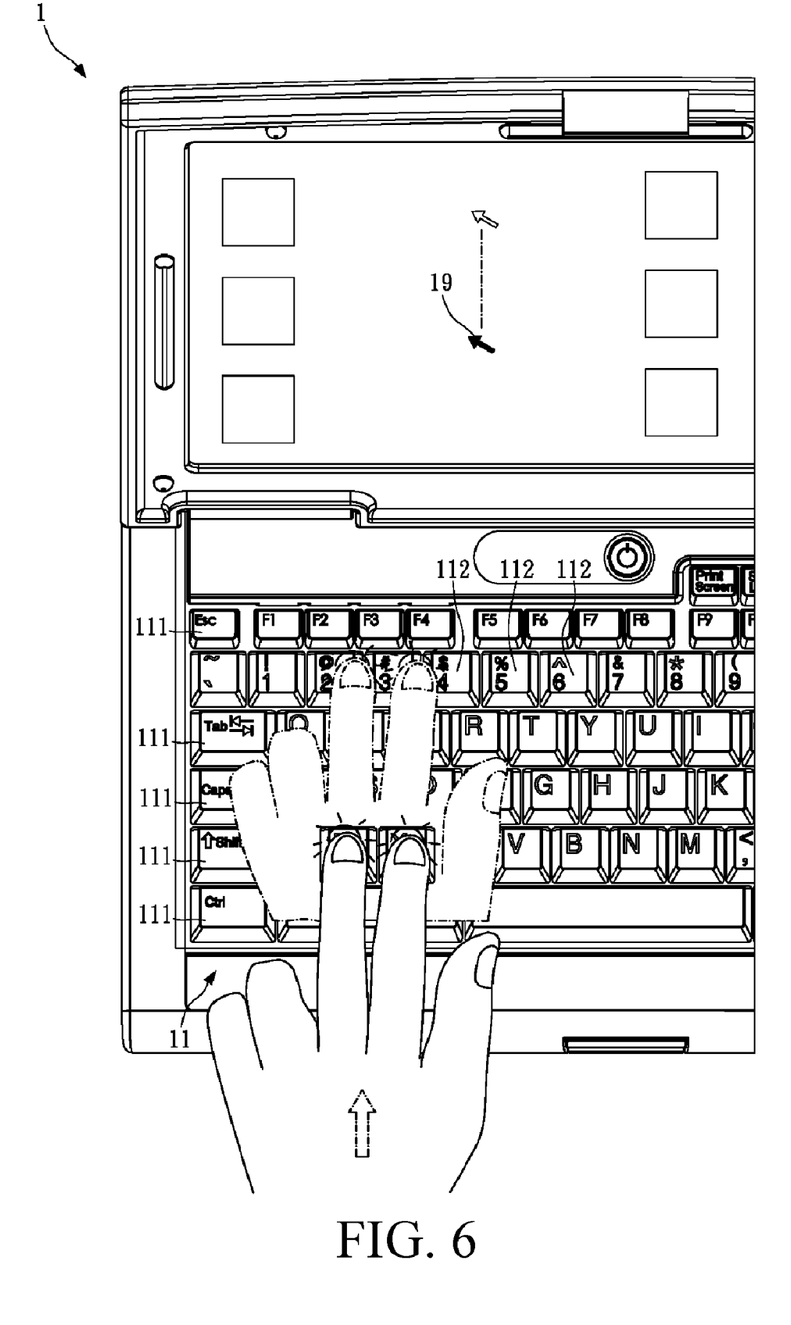
FIG. 6 is a third schematic view of the second embodiment of the present invention.
Figure 7:
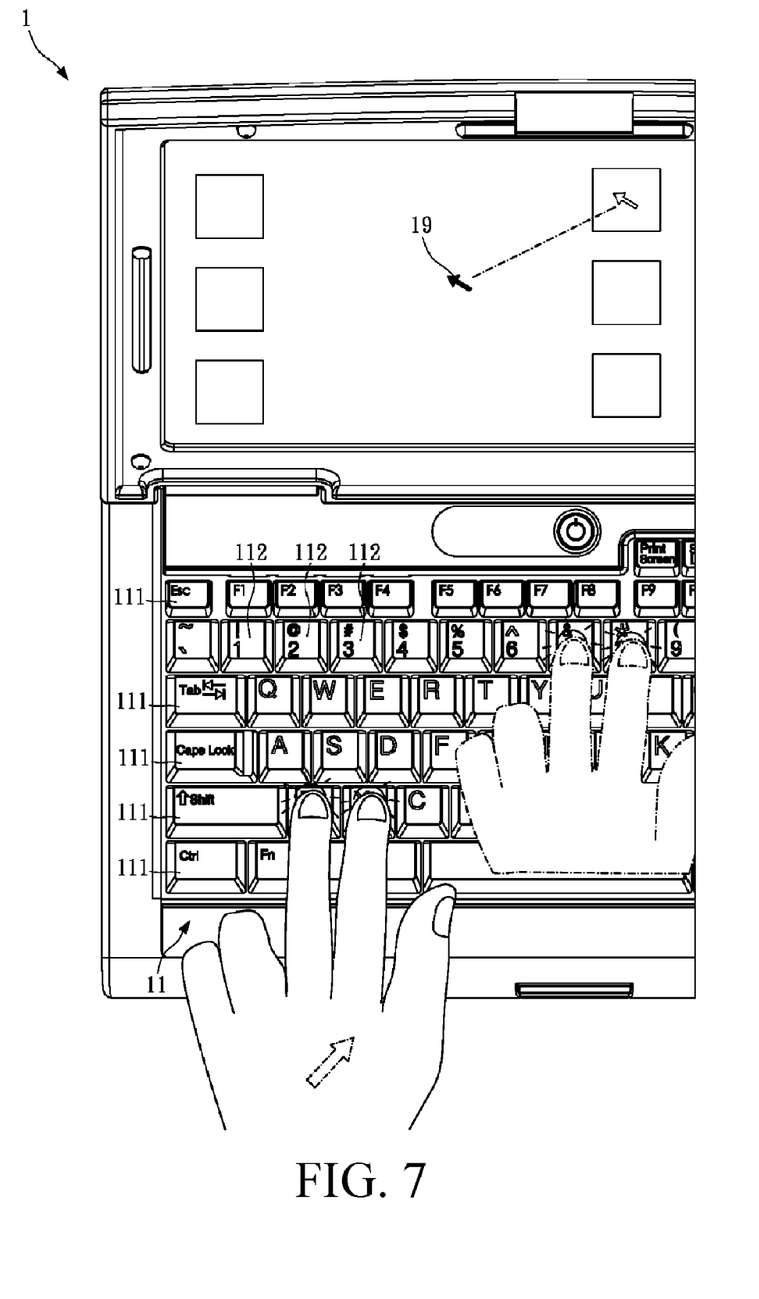
FIG. 7 is a fourth schematic view of the second embodiment of the present invention.

Please refer to FIG. 6 and FIG. 7, respectively a third schematic view and a fourth schematic view of the second embodiment of the present disclosure. The computer system 1 may control the pointer 19 to move along an upward or inclined upward direction according to the vector defined by the first coordinate and the second coordinate.

Figure 8:
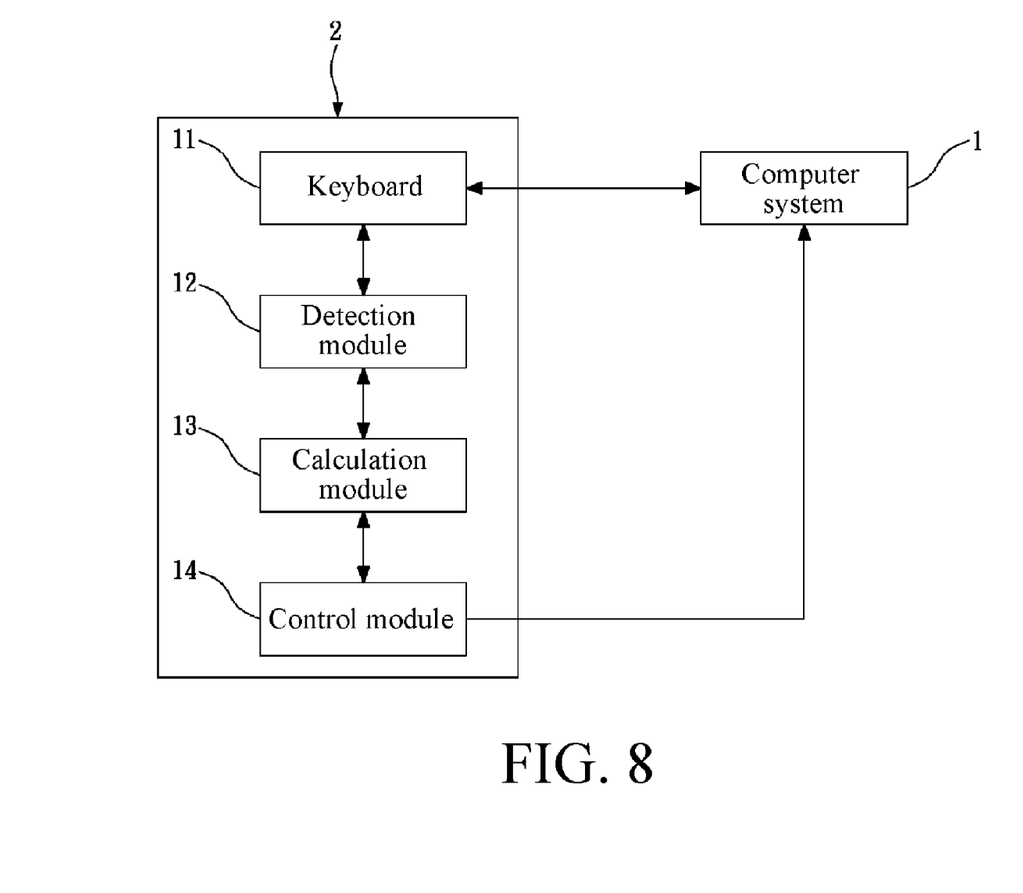
FIG. 8 is a diagram of device modules according to a third embodiment and a fourth embodiment of the present invention.

Please refer to FIG. 8, which is a diagram of device modules according to a third embodiment and a fourth embodiment of the present disclosure. A pointer control device 2 applicable to a computer system 1 is disclosed, including a keyboard 11, a detection module 12, a calculation module 13, and a control module 14. For the third embodiment of the present invention, reference may be made to FIG. 2, FIG. 3 and the following description.

The keyboard 11 is electrically connected to the computer system 1, and includes a plurality of control keys 111 and a plurality of non-control keys 112. The control keys 111 refer to keys with special control functions but without a character input function, for example, "Esc", "Tab", "Shift", "Ctrl", "Alt", and so on. The non-control keys 112 refer to keys with a character input function but without a special function, for example, number keys 1 to 9, and letter keys A to Z. As shown in FIG. 1 to FIG. 5, the non-control keys 112 are arranged in a matrix and each has an X coordinate and a Y coordinate individually. The detection module 12 is used to detect a first key event and a second key event in sequence. The first key event refers to that more than two non-control keys are pressed simultaneously, and the second key event refers to that one non-control key 112 is pressed.

The calculation module 13 is used to calculate a first coordinate, a second coordinate and a vector defined by the first coordinate and the second coordinate. As described in the first embodiment, an X coordinate of the first coordinate is an average value of X coordinates of the non-control keys 112 pressed in the first key event, and a Y coordinate of the first coordinate is an average value of Y coordinates of the non-control keys 112 pressed in the first key event. An X coordinate of the second coordinate is an X coordinate of the non-control key pressed in the second key event, and a Y coordinate of the second coordinate is a Y coordinate of the non-control key pressed in the second key event.

The control module 14 is used to control movement of the pointer 19 displayed on a screen of the computer system 1 according to the vector. A moving direction of the pointer is 19 is the direction of the vector, and a moving speed of the pointer 19 is determined by the value of the vector.

In another implementation aspect, when the vector calculated by the calculation module 13 is not a zero vector, the control module 14 controls the pointer 19 to move continuously along the direction of the vector. When the vector calculated by the calculation module 13 is a zero vector, the control module 14 controls the pointer 19 to remain static.

In another implementation aspect, the second key event and the first key event occur at an interval of a first time. The control module 14 controls the moving speed of the pointer 19 according to a ratio of the value of the vector to the first time. That is, under the circumstance that the value of the vector remains unchanged, if the time interval between the second key event and the first key event is smaller, the moving speed of the pointer 19 is greater. A specific operation is similar to a finger sliding among the non-control keys 112 on the keyboard 11. When the finger slides faster, the moving speed of the pointer is greater. Once the movement is started, the pointer 19 moves continuously until the calculation module 13 calculates a zero vector and the control module controls the pointer 19 to remain static according to the zero vector calculated by the calculation module 13.

In another implementation aspect, when the pointer is in a static state, the detection module 12 detects a third key event to define so called left mouse button signal and right mouse button signal. The third key event refers to that more than two non-control keys 112 are pressed simultaneously and released, and during the pressing and releasing process, no other non-control keys 112 are pressed. When the pressed non-control keys 112 are adjacent to each other, the control module 14 outputs a left mouse button signal. When the pressed non-control keys 112 are not adjacent to each other, the control module 14 outputs a right mouse button signal. It is also possible that when the pressed non-control keys 112 are adjacent to each other, the control module 14 outputs a right mouse button signal, and when the pressed non-control keys 112 are not adjacent to each other, the control module 14 outputs a left mouse button signal.

In another implementation aspect, the control module 14 classifies the non-control keys 112 into a first non-control key group and a second non-control key group. The control module 14 then outputs a left mouse button signal or a right mouse button signal according to whether the non-control keys 112 pressed in the third key event belong to the first non-control key group or the second non-control key group. For example, keys on the left half part of the keyboard, namely, the non-control keys 112 left to key T, key G, and key B (including the key T, key G, and key B), are defined as the first non-control key group; keys on the right half part of the keyboard, namely, the non-control keys 112 right to key Y, key H, and key N (including the key Y, key H, and key N), may be defined as the second non-control key group. In this manner, when the non-control keys 112 pressed in the third key event belong to the first non-control key group, the control module 14 outputs a left mouse button signal; when the non-control keys 112 pressed in the third key event belong to the second non-control key group, the control module 14 outputs a right mouse button signal. This description is merely an example of a method for defining the first key group and the second key group, and the present disclosure is not limited thereto.

In another implementation aspect, the first key event may also be that three keys 112 are pressed simultaneously. As shown in FIG. 3, the three keys pressed are key W, key E and key R respectively. It is assumed that coordinates thereof are respectively (2, 3), (3, 3), and (4, 3). Then, the first coordinate calculated by the calculation module 13 is (3, 3). Similarly, four or more non-control keys 112 may be pressed simultaneously. However, it should be noted that, in firmware of the conventional keyboard, simultaneous pressing of multiple non-control keys 112 is regarded as a mis-touch or produces unexpected output. The problem may be solved if an n-key rollover keyboard is used, but the present disclosure is not limited thereto.

For the fourth embodiment of the present invention, reference may be made to FIG. 4, FIG. 5, and FIG. 8. The fourth embodiment differs from the third embodiment mainly in the detection module 12 and the calculation module 13, which are described as follows.

In the fourth embodiment, the detection module 12 is used to detect a first key event and a second key event in sequence. The first key event refers to that more than two non-control keys 112 are pressed simultaneously, and the second key pressing event also refers to that more than two non-control keys 112 are pressed simultaneously.

In addition, the calculation module 13 of the fourth embodiment is used to calculate a first coordinate, a second coordinate and a vector defined by the first coordinate and the second coordinate. As described in the second embodiment, an X coordinate of the first coordinate is an average value of X coordinates of the non-control keys 112 pressed in the first key event, and a Y coordinate of the first coordinate is an average value of Y coordinates of the non-control keys 112 pressed in the first key event. An X coordinate of the second coordinate is an average value of X coordinates of the non-control keys pressed in the second key event, and a Y coordinate of the second coordinate is an average value of Y coordinates of the non-control keys pressed in the second key event. The fourth embodiment and the third embodiment are generally the same except the foregoing difference.

In an implementation aspect, it should be ensured that one or more non-control keys 112 are in a pressed state during an interval between the first key event and the second key event. A key sliding method that a pianist uses during performance is used as an example to illustrate a specific operation. A user first presses more than two non-control keys 112 simultaneously, keeps the fingers pressing on the keyboard, and then slides the fingers to another two non-control keys 112 in manner similar to the key sliding method. During the process, all non-controlled keys 112 touched by the fingers are pressed.

In an implementation aspect, the control keys 111 specifically refer to keys that change functions of other keys, for example, "Shift", "Ctrl" and "Alt". All other keys are non-control keys 112. In the implementation aspect, it is particularly defined that the control keys 111 specifically refer to keys such as "Shift", "Ctrl" and "Alt" because in general usage, such keys are used in combination with other keys, and other keys are usually used independently. One concept of the present invention is on the basis that, in general usage, the non-control keys on the keyboard are barely pressed simultaneously; therefore, two or more non-control keys being pressed simultaneously is regarded as the first key event or the second key event, thereby controlling movement of a cursor. In this manner, control over the cursor movement and common functions of an existing keyboard are integrated, and do not interfere with each other.

It should be noted that, the term "simultaneously" in the preceding embodiments is relative to the computer system, and does not refers to exact simultaneity. That is, the firmware of the keyboard or the processor scans the status of keys on the keyboard 112 at a unit time interval (for example, 0.1 second). All key pressing actions in the same scanning period are construed as simultaneous actions, and exact simultaneity is unnecessary.

The pointer control method and the pointer control device disclosed in the foregoing embodiments enable a user to control the movement of the pointer directly through the keyboard.

While the present disclosure has been described by the way of example and in terms of the preferred embodiments, it is to be understood that the invention need not be limited to the disclosed embodiments. On the contrary, it is intended to cover various modifications and similar arrangements included within the spirit and scope of the appended claims, the scope of which should be accorded the broadest interpretation so as to encompass all such modifications and similar structures.

What is claimed is:

1. A pointer control method of a computer system, the computer system having a keyboard, the keyboard comprising a plurality of control keys and a plurality of non-control keys, the non-control keys being arranged in a matrix, and each of the non-control keys having an X coordinate and a Y coordinate individually, the method comprising:
   detecting a first key event, wherein the first key event refers to that at least two non-control keys are pressed simultaneously;
   calculating a first coordinate, wherein an X coordinate of the first coordinate is an average value of X coordinates of the at least two non-control keys pressed in the first key event, and a Y coordinate of the first coordinate is an average value of Y coordinates of the non-control keys pressed in the first key event;
   detecting a second key event after the first key event, and the second key event refers to that one non-control key is pressed;

calculating a second coordinate, wherein an X coordinate of the second coordinate is an X coordinate of the non-control key pressed in the second key event, and a Y coordinate of the second coordinate is a Y coordinate of the non-control key pressed in the second key event;

calculating a vector defined by the first coordinate and the second coordinate; and control movement of the pointer according to the vector.

2. The pointer control method according to claim 1, wherein when the vector is not a zero vector, the pointer is controlled to move continuously along a direction of the vector; when the vector is a zero vector, the pointer is controlled to remain static.

3. The pointer control method according to claim 2, wherein the second key event and the first key event occur at an interval of a first time, the pointer control method further comprises:

controlling a moving speed of the pointer according to a ratio of a value of the vector to the first time.

4. The pointer control method according to claim 1, wherein a time interval between the second key event and the first key event is less than a preset time.

5. The pointer control method according to claim 2, wherein when the pointer is static, the method further comprises:

detecting a third key event, wherein the third key event refers to that more than two non-control keys are pressed simultaneously and released, and during the pressing and releasing process, no other non-control keys are pressed.

6. The pointer control method according to claim 5, further comprising:

outputting a left mouse button signal or a right mouse button signal according to whether the non-control keys pressed in the third key event are adjacent to each other.

7. The pointer control method according to claim 5, further comprising:

classifying the non-control keys into a first non-control key group and a second non-control key group; and outputting a left mouse button signal or a right mouse button signal according to whether the non-control keys pressed in the third key event belong to the first non-control key group or the second non-control key group.

8. A pointer control method of a computer system, the computer system having a keyboard and a pointer unit, the keyboard comprising a plurality of control keys and a plurality of non-control keys, the non-control keys are arranged in a matrix, and each of the non-control keys having an X coordinate and a Y coordinate individually, the method comprising:

detecting a first key event, wherein the first key event refers to that at least two non-control keys are pressed substantially simultaneously;

calculating a first coordinate, wherein an X coordinate of the first coordinate is an average value of X coordinates of the at least two non-control keys pressed in the first key event, and a Y coordinate of the first coordinate is an average value of Y coordinates of the non-control keys pressed in the first key event;

detecting a second key even after the first key event, and the second key event refers to that at least two non-control keys are pressed;

calculating a second coordinate, wherein an X coordinate of the second coordinate is an average value of X coordinates of the at least two non-control keys pressed in the second key event, and a Y coordinate of the second coordinate is an average value of Y coordinates of the non-control keys pressed in the second key event;

calculating a vector defined by the first coordinate and the second coordinate; and control movement of the pointer according to the vector.

9. The pointer control method according to claim 8, wherein when the vector is not a zero vector, the pointer is controlled to move continuously along a direction of the vector;

when the vector is a zero vector, the pointer is controlled to remain static.

10. The pointer control method according to claim 9, wherein the second key event and the first key event occur at an interval of a first time, the pointer control method further comprises:

controlling a moving speed of the pointer according to a ratio of a value of the vector to the first time.

11. The pointer control method according to claim 8, wherein a time interval between the second key event and the first key event is less than a preset time.

12. The pointer control method according to claim 9, wherein when the pointer is static, the method further comprises:

detecting a third key event, wherein the third key event refers to that more than two non-control keys are pressed simultaneously and released, and during the pressing and releasing process, no other non-control keys are pressed.

13. The pointer control method according to claim 12, further comprising:

outputting a left mouse button signal or a right mouse button signal according to whether the non-control keys pressed in the third key event are adjacent to each other.

14. The pointer control method according to claim 12, further comprising:

classifying the non-control keys into a first non-control key group and a second non-control key group; and outputting a left mouse button signal or a right mouse button signal according to whether the non-control keys pressed in the third key event belong to the first non-control key group or the second non-control key group.

15. A pointer control device of a computer system, the pointer control device comprising:

a keyboard, electrically connected to the computer system and comprising a plurality of control keys and a plurality of non-control keys, wherein the non-control keys are arranged in a matrix and each of the non-control keys has an X coordinate and a Y coordinate individually;

a detection module for detecting a first key event and a second key event in sequence, wherein the first key event refers to that at least two non-control keys are pressed simultaneously, and the second key event refers to that one non-control key is pressed;

a calculation module, used to calculate a first coordinate, a second coordinate, and a vector defined by the first coordinate and the second coordinate, wherein an X coordinate of the first coordinate is an average value of X coordinates of the non-control keys pressed in the first key event, and a Y coordinate of the first coordinate is an average value of Y coordinates of the non-control keys pressed in the first key event; an X coordinate of the second coordinate is an X coordinate of the non-control key pressed in the second key event, and a Y coordinate of the second coordinate is a Y coordinate of the non-control key pressed in the second key event; and a control module, used to control movement of the pointer according to the vector.

16. The pointer control device according to claim 15, wherein when the vector is not a zero vector, the control module controls the pointer to move continuously along a direction of the vector; when the vector is a zero vector, the control module controls the pointer to remain static; and wherein the second key event and the first key event occur at an interval of a first time, and the control module controls a moving speed of the pointer according to a ratio of a value of the vector to the first time.

17. The pointer control device according to claim 16, wherein the detection module is further used to detect a third key event when the pointer is static, the third key event refers to that more than two non-control keys are pressed simultaneously and released, and during the pressing and releasing process, no other non-control keys are pressed.

18. The pointer control device according to claim 17, wherein the control module is further used to output a left mouse button signal or a right mouse button signal according to whether the non-control keys pressed in the third key event are adjacent to each other.

19. The key control device according to claim 17, wherein the control module is further used to classify the non-control keys into a first non-control key group and a second non-control key group, and output a left mouse button signal or a right mouse button signal according to whether the non-control keys pressed in the third key event belong to the first non-control key group or the second non-control key group.

20. The pointer control device according to claim 15, wherein a time interval between the second key event and the first key event is less than a preset time.

* * * * *